UNITED STATES PATENT OFFICE.

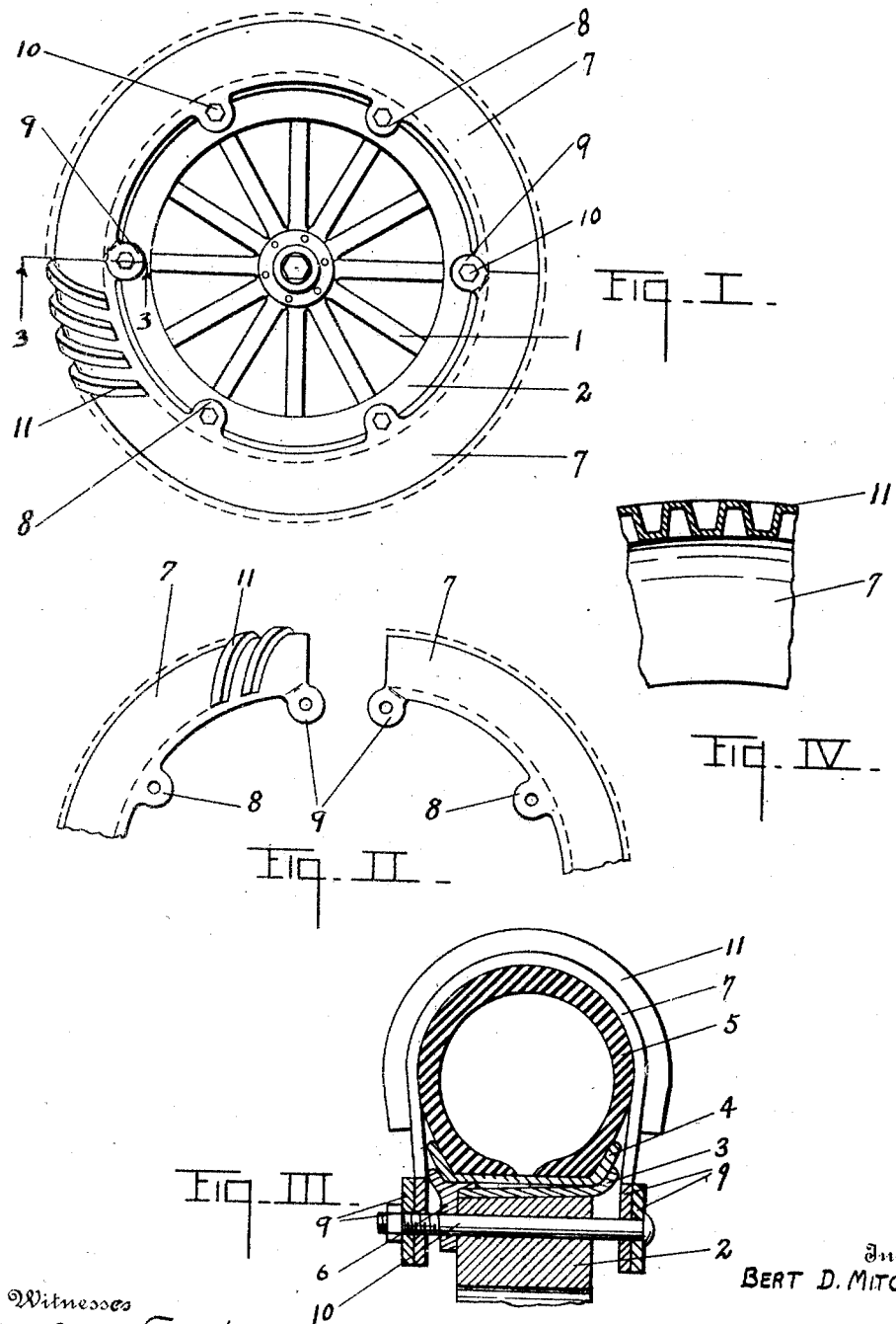

BERT D. MITCHELL, OF BATTLE CREEK, MICHIGAN.

AUXILIARY TREAD FOR MOTOR-VEHICLE WHEELS.

1,366,921.     Specification of Letters Patent.     Patented Feb. 1, 1921.

Application filed June 7, 1920. Serial No. 387,061.

*To all whom it may concern:*

Be it known that I, BERT D. MITCHELL, a citizen of the United States, residing at Battle Creek, county of Calhoun, State of Michigan, have invented certain new and useful Improvements in Auxiliary Treads for Motor-Vehicle Wheels, of which the following is a specification.

This invention relates to improvements in auxiliary treads for motor vehicle wheels.

The main objects of this invention are:

First, to provide an improved auxiliary or emergency tire for vehicle wheels which may be applied to a wheel over pneumatic or cushion tires providing a complete tread for the wheel.

Second, to provide an improved auxiliary or emergency tire for motor vehicle wheels which is well adapted for securing traction.

Further objects, and objects relating to structural details will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing forming a part of this specification, in which:

Figure I is a side elevation of a vehicle wheel embodying the features of my invention, parts being shown mainly in conventional form.

Fig. II is a detail side view of my auxiliary tire illustrating the manner of assembling or disassembling, the parts being shown conventionally.

Fig. III is a detail transverse section on a line 3—3 of Fig. I.

Fig. IV is a detail longitudinal section through one of the treads.

In the drawing similar reference characters refer to similar parts throughout the several views, and the sectional view is taken looking in the direction of the little arrows at the ends of the section lines.

Referring to the drawing, the wheel 1 is provided with a felly 2 having the band 3 adapted to receive the demountable rim 4 of the tire 5. The rim clamping lugs 6 are of the well known type.

I provide an auxiliary tire consisting of complementary segmental sections 7 of channel cross section which peripherally embrace the tire 5, the sections 7 having inwardly projecting lugs 8 on the edges of their flanges, the end lugs 9 being arranged to overlap as shown in Fig. III.

In mounting the auxiliary tire upon a wheel, the bolts for the rim clamping lugs 6 are removed and the auxiliary or emergency tire members 7 are placed over the tire and the bolts 10 arranged through the felly and the lugs 8 and overlapping the lugs 9 at the ends of the tire as shown in Fig. III, and through the rim clamping lugs 6, the auxiliary tire members being clamped upon the rim clamping lugs so that they serve to retain them in place.

The auxiliary tire members are preferably provided with tread lugs 11 in the form of corrugations disposed diagonally across the tire members. These serve to make the auxiliary tire members very rigid although made of sheet metal.

With the parts thus arranged, the entire load is carried on the auxiliary tire members so that in the event of accident to a pneumatic tire, the auxiliary tread members may be put in place to carry the load and protect the tire, or where traction condition makes it desirable as in sand or snow or mud, the auxiliary tire members may be applied.

Having thus described my invention, what I claim as new and desire to secure by Letters Patent is:

The combination with a vehicle wheel comprising a felly and a tire, of an auxiliary tire of channel cross section peripherally embracing the main tire and comprising segmental complementary sections having lugs projecting inwardly from the sides thereof, there being lugs at the ends of the sections disposed to overlap and having registering holes, and bolts arranged through said lugs and felly whereby the auxiliary tire is rigidly mounted upon the felly.

In witness whereof, I have hereunto set my hand and seal in the presence of two witnesses.

BERT D. MITCHELL. [L. S.]

Witnesses:
ANNA W. HAUGHEY,
BENNETT HAMILTON.